United States Patent
Castrejon, III et al.

(10) Patent No.: US 12,095,607 B1
(45) Date of Patent: Sep. 17, 2024

(54) SYSTEM FOR ENHANCED ANOMALY RECOGNITION IN NETWORK TOPOLOGIES USING INTERACTIVE VISUALIZATION

(71) Applicant: BANK OF AMERICA CORPORATION, Charlotte, NC (US)

(72) Inventors: Tomas M. Castrejon, III, Fort Mill, SC (US); James J. Siekman, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/200,389

(22) Filed: May 22, 2023

(51) Int. Cl.
  *H04L 41/0659*  (2022.01)
  *H04L 41/22*    (2022.01)

(52) U.S. Cl.
  CPC .......... *H04L 41/0659* (2013.01); *H04L 41/22* (2013.01)

(58) Field of Classification Search
  CPC .................. H04L 41/0659; H04L 41/22
  See application file for complete search history.

(56) References Cited

U.S. PATENT DOCUMENTS

| | | | |
|---|---|---|---|
| 7,889,666 B1 * | 2/2011 | Pei | H04L 41/065 370/242 |
| 8,483,056 B2 | 7/2013 | Chen | |
| 9,705,849 B2 | 7/2017 | Sood | |
| 10,791,141 B2 | 9/2020 | Peteroy | |
| 10,798,113 B2 | 10/2020 | Muddu | |
| 10,867,036 B2 | 12/2020 | Komarek | |
| 10,893,004 B2 | 1/2021 | Tillotson | |
| 11,165,800 B2 | 11/2021 | Thampy | |
| 11,223,639 B2 | 1/2022 | Mandrychenko | |
| 11,323,465 B2 | 5/2022 | Cheng | |
| 11,399,037 B2 | 7/2022 | Cavallari | |
| 11,539,720 B2 | 12/2022 | Reybok, Jr. | |
| 11,683,333 B1 | 6/2023 | Dominessy | |

(Continued)

FOREIGN PATENT DOCUMENTS

WO  2021050007 A1  3/2021

OTHER PUBLICATIONS

Zuo et al., "An Intelligent Anomaly Detection Scheme for Micro-Services Architectures With Temporal and Spatial Data Analysis," IEEE Transactions on Cognitive Communications and Networking, vol. 6, No. 2, Jun. 2020 (Year: 2020).*

(Continued)

*Primary Examiner* — Alina A Boutah
(74) *Attorney, Agent, or Firm* — Moore & Van Allen PLLC; Anup Shrinivasan Iyer (57) ABSTRACT

Systems, computer program products, and methods are described herein for anomaly recognition in network topologies using interactive visualization. The present disclosure is configured to determine that an end-point device is associated with anomalous activity; capture, using a virtual reality application installed on a user input device, real-time network traffic associated with the end-point device; isolate, using the virtual reality application, network traffic associated with the anomalous activity; initiate spatial and temporal traffic analysis on the anomalous activity; determine a remedial action based on the spatial and temporal traffic analysis to mitigate effects of the anomalous activity; and implement the remedial action on the end-point device.

20 Claims, 4 Drawing Sheets

(56) References Cited

U.S. PATENT DOCUMENTS

| | | | |
|---|---|---|---|
| 11,824,646 B1 | 11/2023 | Muddu | |
| 11,855,968 B2 | 12/2023 | Subbarayan | |
| 11,943,200 B2 | 3/2024 | Wahbo | |
| 2007/0055782 A1* | 3/2007 | Wright | H04L 41/22 709/227 |
| 2016/0217056 A1* | 7/2016 | Chua | G06F 11/3404 |
| 2017/0310546 A1* | 10/2017 | Nair | H04W 24/08 |
| 2019/0043201 A1* | 2/2019 | Strong | G06V 10/96 |
| 2020/0092315 A1* | 3/2020 | Cheng | G06N 3/045 |
| 2020/0245182 A1* | 7/2020 | Chitta | H04W 28/0252 |
| 2020/0314245 A1* | 10/2020 | Chavez | H04M 3/5235 |
| 2020/0396147 A1* | 12/2020 | Han | H04L 43/16 |
| 2021/0099943 A1* | 4/2021 | Dannebro | H04L 67/63 |
| 2021/0409082 A1* | 12/2021 | Kontio | H04W 72/542 |
| 2022/0086050 A1* | 3/2022 | Goloubev | H04L 41/145 |
| 2022/0374855 A1* | 11/2022 | Balaoro | G06Q 20/401 |
| 2022/0385635 A1 | 12/2022 | Thimmisetty | |
| 2022/0385683 A1 | 12/2022 | Jones | |
| 2022/0394680 A1* | 12/2022 | Kim | H04W 48/12 |
| 2023/0128064 A1* | 4/2023 | Wang | G06N 3/08 726/1 |
| 2023/0136756 A1* | 5/2023 | Malboubi | H04L 41/147 709/224 |
| 2023/0300159 A1 | 9/2023 | Lin | |
| 2023/0388338 A1 | 11/2023 | Satish | |
| 2023/0388832 A1* | 11/2023 | Huang | G06N 3/08 |
| 2024/0049042 A1* | 2/2024 | Worrall | H04W 28/0252 |
| 2024/0106839 A1* | 3/2024 | Smith | H04L 63/1441 |

OTHER PUBLICATIONS

Marina Polupanova, "VR Traffic Dataset on Broad Range of End-User Activities," MDPI, Bell Labs Consulting, Murray Hill, NJ 07974, USA; Published: Aug. 17, 2023 (Year: 2023).*

Retraction "Retracted: Network Traffic Prediction via Deep Graph-Sequence Spatiotemporal Modeling Based on Mobile Virtual Reality Technology," Hindawi Wireless Communications and Mobile Computing vol. 2023, Article ID 9806091, 2023 (Year: 2023).*

\* cited by examiner

SYSTEM FOR ENHANCED ANOMALY RECOGNITION IN NETWORK TOPOLOGIES USING INTERACTIVE VISUALIZATION

TECHNOLOGICAL FIELD

Example embodiments of the present disclosure relate to anomaly recognition and analysis in network topologies.

BACKGROUND

In a large computing environment with numerous interconnected end-point systems, it is crucial to gather diverse information, including system events, malware type events, and component malfunction events, to ensure comprehensive monitoring and timely detection of exposures and threats.

Applicant has identified a number of deficiencies and problems associated with anomaly recognition and analysis. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for anomaly recognition in network topologies using interactive visualization.

In one aspect, a system for anomaly recognition in network topologies using interactive visualization is presented. The system comprising: a processing device; a non-transitory storage device containing instructions when executed by the processing device, causes the processing device to: determine that an end-point device is associated with anomalous activity; capture, using a virtual reality application installed on a user input device, real-time network traffic associated with the end-point device; isolate, using the virtual reality application, network traffic associated with the anomalous activity; initiate spatial and temporal traffic analysis on the anomalous activity; determine a remedial action based on the spatial and temporal traffic analysis to mitigate effects of the anomalous activity; and implement the remedial action on the end-point device.

In some embodiments, executing the instructions further causes the processing device to: determine, using the virtual reality application, an initiator and a recipient associated with the anomalous activity based on the spatial and temporal traffic analysis; initiate an access management evaluation on the initiator and the recipient; determine access controls associated with the initiator and the recipient contributing to the anomalous activity; and initiate a reassessment of the access controls associated with the initiator and the recipient.

In some embodiments, executing instructions to capture the real-time network traffic further causes the processing device to: generate a multi-dimensional model of the real-time network traffic associated with the end-point device; and display, via the virtual reality application, the multi-dimensional model to a user.

In some embodiments, the multi-dimensional model further comprises a stack of data layers for visualization of the real-time network traffic, wherein the stack of data layers comprises a network topology layer, a network traffic layer, a performance metric layer, an incident layer, an application data layer, and nodal information layer.

In some embodiments, executing the instructions further causes the processing device to: receive, via the user input device, a user selection of one or more data layers from the stack of data layers; generate the multi-dimensional model of the real-time network traffic by overlaying the one or more data layers on one another; and display, via the virtual reality application, the multi-dimensional model with the one or more data layers overlaid on one another to the user.

In some embodiments, executing the instructions further causes the processing device to: determine that the end-point device is associated with a device administrator; trigger an access prompt on a computing device associated with the device administrator to allow the device administrator to access the multi-dimensional model of the real-time network traffic; receive a request from the computing device of the device administrator to access the multi-dimensional model in response to the access prompt; and generate a controlled access version of the multi-dimensional model of the real-time network traffic in response to the request.

In some embodiments, the level of access associated with the controlled access version of the multi-dimensional model is based on an authorization level of the device administrator.

In some embodiments, executing the instructions further causes the processing device to: isolate the end-point device in response to determining that the end-point device is associated with anomalous activity; and implement the remedial action on the isolated end-point device to mitigate the effects of the anomalous activity.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Embodiments of the invention leverage extended reality (XR) technologies such as virtual reality (VR) and/or augmented reality (AR) to visualize network traffic within a computing environment, offering an immersive and interactive experience for security analysts and network administrators. By representing complex network data in a multi-dimensional (e.g., three dimensional), visually engaging format, XR can facilitate a more intuitive understanding of the traffic patterns, communication flows, and potential bottlenecks within the system. This enhanced visualization can enable users to easily identify anomalies, such as unusual spikes in traffic or unauthorized connections, which may indicate potential exposures or threats. Furthermore, the interactive nature of XR technologies allows users to manipulate and explore the network data from various perspectives, providing deeper insights into the underlying dynamics of the computing environment.

For example, VR provides a multi-dimensional, immersive environment that allows users to explore and interact with network traffic in a more intuitive and engaging manner compared to conventional two-dimensional representations. The visually rich representation of network traffic in VR facilitates the identification of patterns, trends, and anomalies that might be difficult to discern using conventional visualization techniques. VR technologies can enable real-time visualization of network traffic data, allowing users to monitor and respond to changes and potential threats as they occur. Users can manipulate and view the network data from various angles and perspectives, offering a deeper understanding of the relationships between different elements within the computing environment. VR can facilitate collaboration among teams by providing a shared, interactive platform where multiple users can explore and discuss network traffic data together, promoting more efficient problem-solving and decision-making. VR technologies can be adapted to visualize network traffic data for various sizes and types of computing environments, from small-scale networks to large, complex infrastructures. Furthermore, the embodiments of the invention described herein uses a rigorous, computerized process to perform specific tasks and/or activities that were not previously performed. In specific implementations, the technical solution bypasses a series of steps previously implemented, thus further conserving computing resources.

Figure 1A:
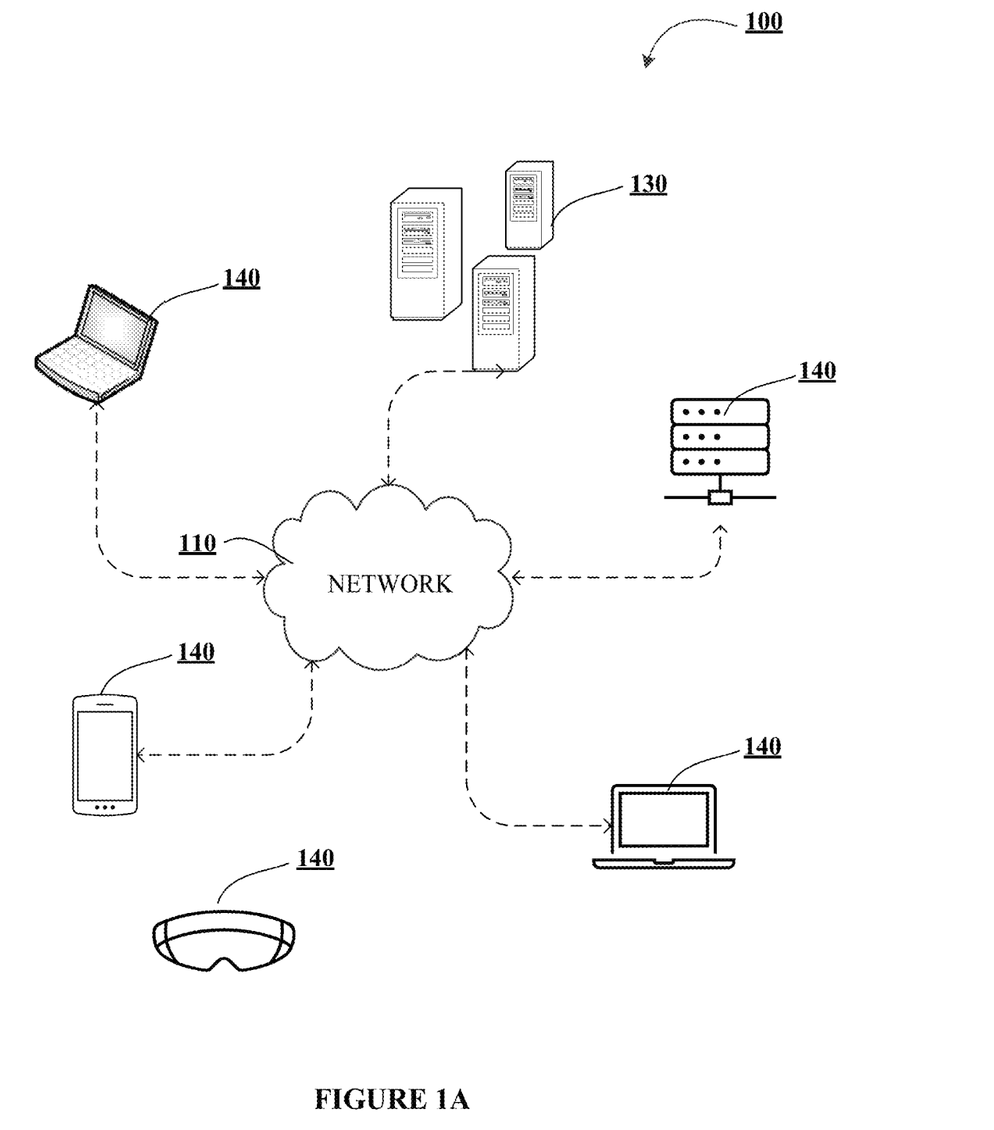
FIGS. 1A-1C illustrates technical components of an exemplary distributed computing environment for anomaly recognition in network topologies using interactive visualization, in accordance with an embodiment of the disclosure.
Figure 1B:
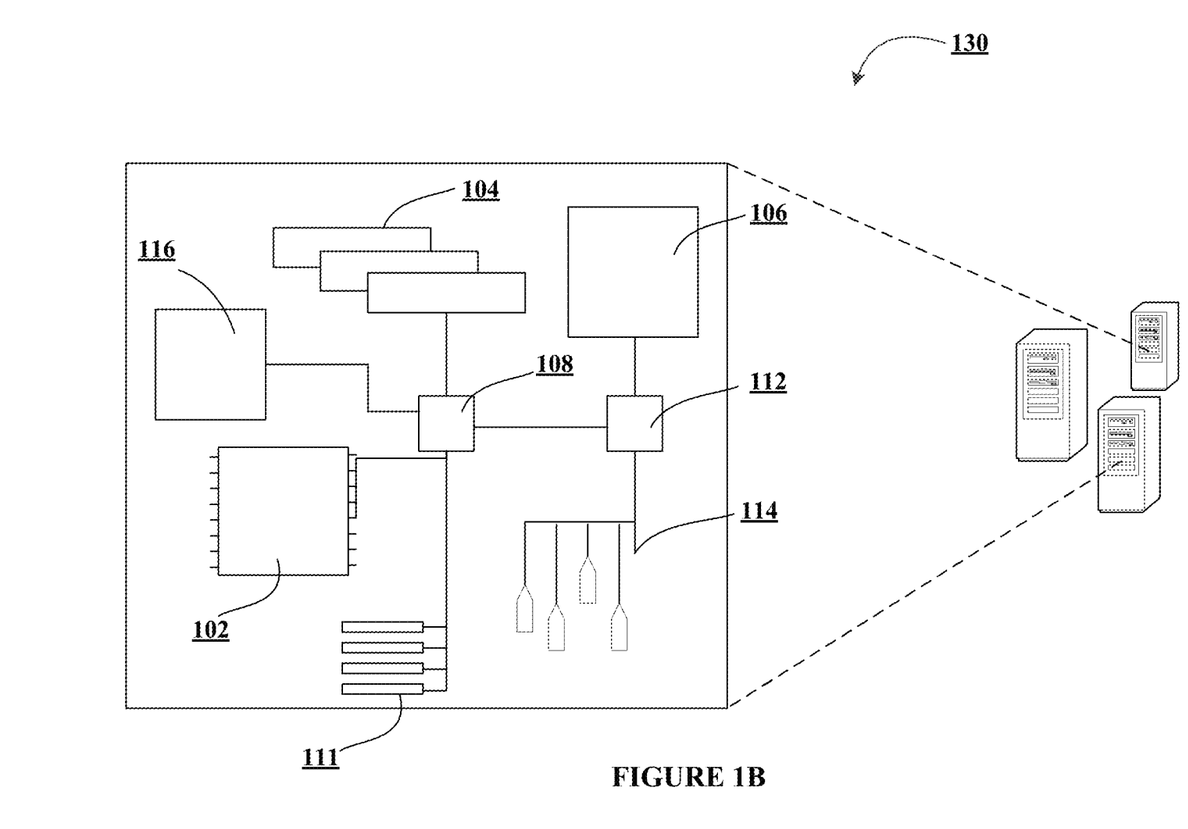
Figure 1C:
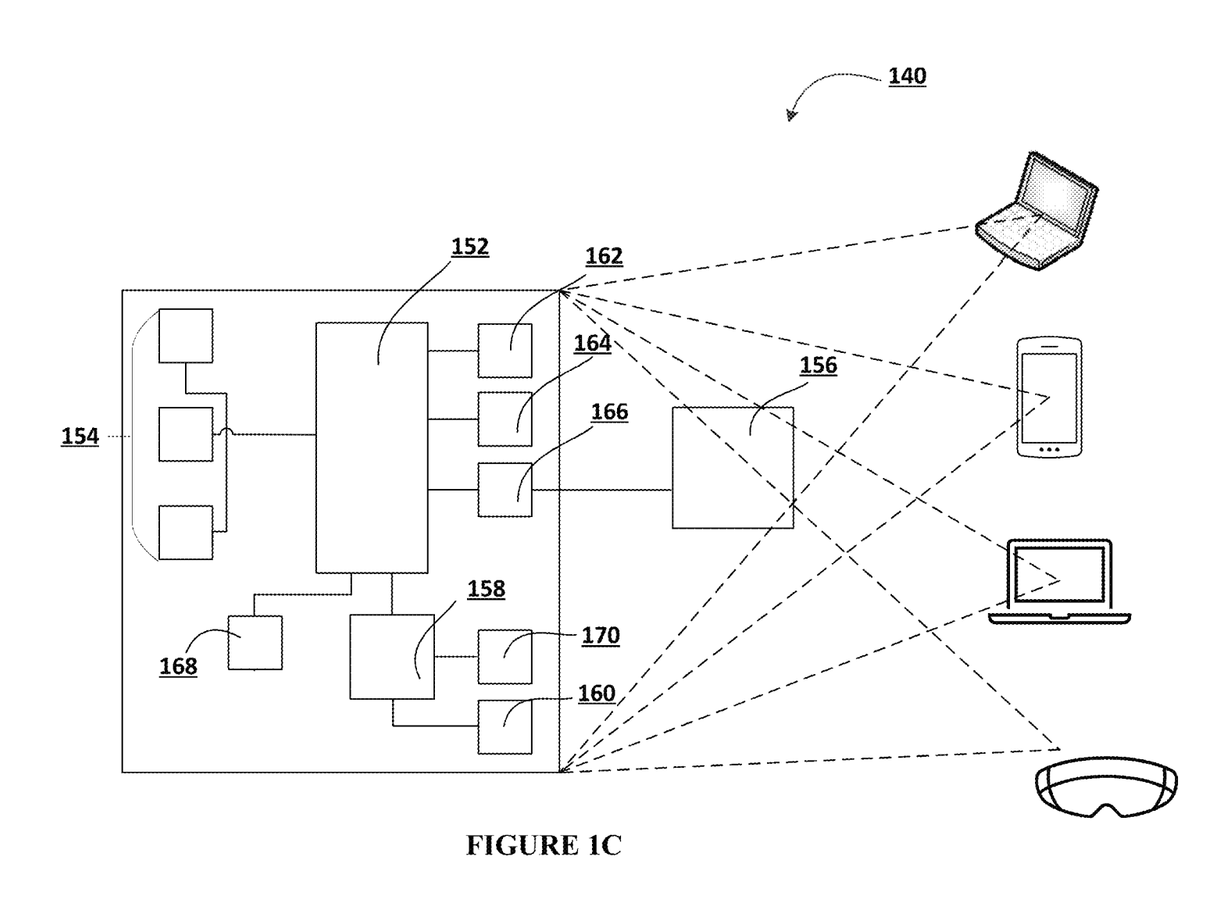

FIGS. 1A-1C illustrate technical components of an exemplary distributed computing environment for anomaly recognition in network topologies using interactive visualization 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as AR/VR devices, including any sensory-perceptible devices that are required to communicate sensory-perceptible indications (e.g., visual, audible or haptic), personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application (e.g., VR application) that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application (e.g., VR application) that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications (e.g., VR application) run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
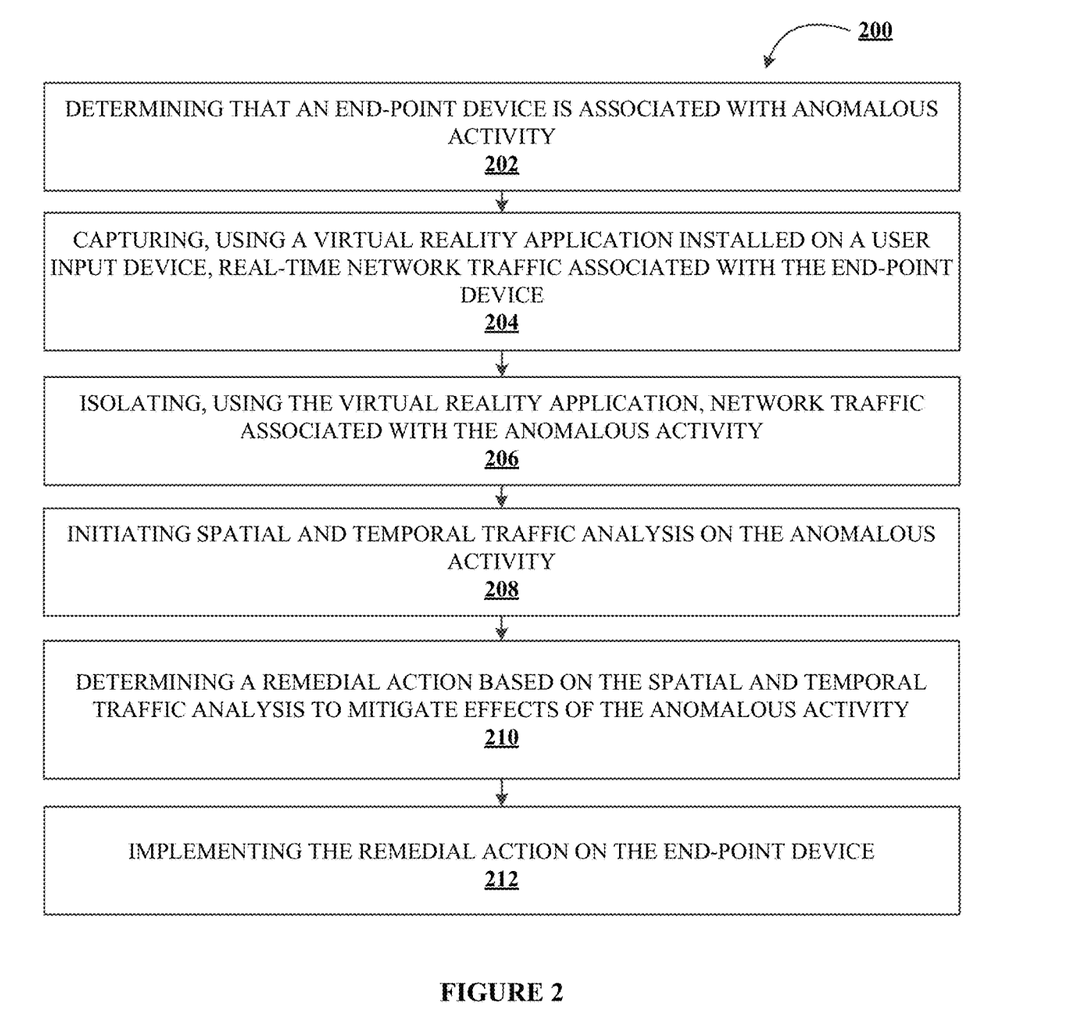
FIG. 2 illustrates a process flow for anomaly recognition in network topologies using interactive visualization, in accordance with an embodiment of the disclosure.

FIG. 2 illustrates a process flow for anomaly recognition in network topologies using interactive visualization 200, in accordance with an embodiment of the disclosure. As shown in block 202, the process flow includes determining that an end-point device is associated with anomalous activity. To this end, in some example embodiments, the system may be configured to continuously monitor network traffic for signs of unusual or unexpected behavior, such as volume, frequency, type, source, and destination of network traffic. In some other example embodiments, the system may use automated tools (e.g., artificial intelligence or machine learning tools) to detect anomalies in network traffic by establishing a baseline of normal network behavior and then alert administrators when they detect deviations from this baseline. In still other example embodiments, the system may analyze logs from network devices, servers, and security systems for signs of unusual activity, such as failed login attempts, changes to device configurations, unusual data transfers, or other suspicious events. In still other example embodiments, the system may use security information and event management (STEM) systems to aggregate and analyze log and event data from a variety of sources, including network devices, security systems, and applications to detect security incidents.

In some embodiments, anomalous activity may refer to network activities that are suspicious, abnormal, or indicative of potential security threats. Examples of anomalous activities may include attempts to gain unauthorized access to a system such as port scanning, brute force attempts, man-in-the-middle attempts, and/or the like, disrupt network services such as a targeted distributed denial of service (DDOS) attempts, misappropriate or alter data such as SQL injection, misappropriation attempts, spoofing, malware distribution, and/or the like, or otherwise harm the network, associated end-point devices, and/or its users.

As shown in block 204, the process flow includes capturing, using a VR application installed on a user input device, real-time network traffic associated with the end-point device. In some embodiments, the system may generate a multi-dimensional model of the real-time network traffic associated with the end-point device, and display, via the virtual reality application, the multi-dimensional model to a user (e.g., network administrator). In an example embodiment, the end-point device may be represented as a multi-dimensional object, such as a sphere or cube. The size, color, and other attributes of the object may represent various characteristics of the end-point device, such as device type (e.g., router, server, workstation, and/or the like), status (e.g., online, offline, and/or the like), load, and/or the like. Any incoming and/or outgoing traffic associated with the end-point device may be represented in the form of streams or particles moving towards or away from the object. The size, color, or speed of these streams or particles could represent different attributes of the traffic, such as its volume, type, or priority. In some example instances, the multi-dimensional model may include different lanes or pathways for different types of traffic. Any permissions and/or access controls may be represented using different colors or patterns indicating different levels of access control, as icons or badges on or around the object, and/or the like. Additionally or alternatively, when the object is selected or focused on, a panel or screen could appear with detailed information about the end-point device's permissions and access controls.

In response to generating the multi-dimensional model, the system may display, via the virtual reality application, the multi-dimensional model to a user. In some embodiments, the user may interact with the object within the VR environment. In an example embodiment, the users may select the object to view more details, adjust settings, or reroute traffic. In another example embodiment, the users may also navigate the network from the perspective of the object, following the paths of incoming or outgoing traffic to see where the traffic comes from and/or where the traffic goes.

In some embodiments, the multi-dimensional model may include a stack of data layers for visualization of the real-time network traffic including a network topology layer, a network traffic layer, a performance metric layer, an incident layer, an application data layer, and nodal information layer. In an example embodiment, a network topology layer may provide visual representation of the physical or logical layout of the network, network traffic layer may provide information about data packets being sent and received over the network, such as their source, destination, and size, performance metric layer may provide data on the performance of the network, such as latency, packet loss, bandwidth usage, and/or the like, an incident layer may provide information associated with security-related events on the network, such as detected threats, breaches, or other anomalies, and application data layer may provide information about various applications running on each end-point device.

In some embodiments, the system may receive, via the user input device, a user selection of one or more data layers from the stack of data layers. In response, the system may generate the multi-dimensional model of the real-time network traffic by overlaying the one or more data layers on one another. Once overlaid, the system may then display, via the virtual reality application, the multi-dimensional model with the one or more data layers overlaid on one another to the user.

In some embodiments, the system may determine that the end-point device is associated with a device administrator. In response, the system may trigger an access prompt on a computing device associated with the device administrator to allow the device administrator to access the multi-dimensional model of the real-time network traffic. In response to the prompt, the system may receive a request from the computing device of the device administrator to access the multi-dimensional model. In response to the request, the system may determine whether the device administrator has the requisite authorization to access the multi-dimensional model. In this regard, the system may determine whether the level of access associated with the device administrator meets the access requirement associated with multi-dimensional model to ensure that the device administrator can only access the information or capabilities of the multi-dimensional model that they are authorized to see or use, based on their role or security clearance. Depending on the level of access associated with the device administrator, the system may generate a controlled access version of the multi-dimensional model of the real-time network traffic in response to the request. In some embodiments, the controlled access version may refer to a version of the multi-dimensional model that is appropriate for the user's level of access.

As shown in block 206, the process flow includes isolating, using the VR application, network traffic associated with the anomalous activity. In some embodiments, the VR application may be integrated with various automated tools monitor network traffic for signs of unusual or unexpected behavior. In doing so, once an anomaly is detected, the VR application can visually highlight the end-point device associated with the anomalous activity. For example, the VR application can change the end-point device's color, size, or other visual attributes, indicate an alert symbol or notification near the node, and/or the like.

As shown in block 208, the process flow includes initiating spatial and temporal traffic analysis on the anomalous activity. In some embodiments, spatial and temporal analysis may be used to understand patterns and behaviors in network traffic over space and time. In a VR environment, spatial analysis may include visualizing the flow of traffic between different network devices (e.g., end-point device) in the network, identifying which network devices are communicating with each other, and understanding the paths that data takes through the network. In doing so, spatial analysis may be used to identify network hotspots, bottlenecks, and anomalies. For example, a high volume of traffic between certain nodes might indicate a potential bottleneck, while an unusual pattern of connections might indicate a potential security threat. In a VR environment, temporal analysis may include visualizing the flow of network traffic at different times, understanding how network usage patterns change over the course of a day, a week, or longer periods to identify patterns and trends, such as peak usage times, changes in the types of traffic being transmitted, or evolving security threats.

Accordingly, in an example embodiment, the system may determine, using the VR application, an initiator and a recipient associated with the anomalous activity based on the spatial and temporal traffic analysis. In response, the system may initiate an access management evaluation on the initiator and the recipient. In some embodiments, the access management evaluation may refer to a systematic assessment of access control policies and procedures associated with the initiator and the recipient. In one aspect, the access management evaluation may include a policy review of access controls associated with the initiator and the recipient to determine whether current policies are comprehensive, up-to-date, and aligned with the entity's needs and requirements. In another aspect, the access management evaluation may include a role-based access control review to determine whether access privileges are assigned appropriately based on the roles of the initiator and recipient within the entity. In yet another aspect, the access management evaluation may include reviewing the access rights of individual users associated with the initiator and the recipient to ensure they are appropriate. This may include checking for inactive accounts, accounts with excessive privileges, accounts that have not been appropriately deprovisioned when users leave the entity, and/or the like. In yet another aspect, the access management evaluation may include reviewing authentication and authorization mechanisms (e.g., password policies, two-factor authentication, biometric systems, single sign-on, and/or the like) associated with the initiator and the recipient.

In doing so, the system may determine specific access controls associated with the initiator and the recipient that are contributing to the anomalous activity. In response, the system may initiate a reassessment of the access controls associated with the initiator and the recipient. Examples of access controls that may contribute to anomalous activity may include excessive permissions where a user or role is granted more permissions than necessary for their job function, inactive or orphaned accounts that are no longer in use, such as those belonging to former employees, shared accounts, basic or weak authentication credentials, privilege escalation, lack of multi-factor authentication, and/or the like.

As shown in block 210, the process flow includes determining a remedial action based on the spatial and temporal traffic analysis to mitigate effects of the anomalous activity. In some embodiments, remedial actions may refer to steps taken to mitigate the effects of detected anomalous activity, minimize damage, prevent further anomalies, and strengthen the overall security posture. In example embodiments, the remedial action may include isolation where the end-point device is disconnected from the network and placed in a quarantine network segment where its traffic is blocked, patch and update in case the anomaly is caused due to a software vulnerability, reevaluate authentication credentials and permissions of the end-point device itself and of its users, reconfigure access controls, reinstall software, and/or the like. As such, in some embodiments, the system may determine the specific type of anomaly detected and determine the appropriate remedial action accordingly.

As shown in block 212, the process flow includes implementing the remedial action on the end-point device. In some embodiments, prior to implementing the remedial action, the system may isolate the end-point device, and in response, implement the remedial action on the isolated end-point device to mitigate the effects of the anomalous activity.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for anomaly recognition in network topologies using interactive visualization, the system comprising:
   a processing device;
   a non-transitory storage device containing instructions when executed by the processing device, causes the processing device to:
   determine that an end-point device is associated with anomalous activity;
   capture, using a virtual reality application installed on a user input device, real-time network traffic associated with the end-point device;
   isolate, using the virtual reality application, network traffic associated with the anomalous activity;
   initiate spatial and temporal traffic analysis on the anomalous activity;
   determine, using the virtual reality application, an initiator and a recipient associated with the anomalous activity based on the spatial and temporal traffic analysis;
   initiate an access management evaluation on the initiator and the recipient;
   determine access controls associated with the initiator and the recipient contributing to the anomalous activity;
   initiate a reassessment of the access controls associated with the initiator and the recipient;
   determine a remedial action based on the spatial and temporal traffic analysis to mitigate effects of the anomalous activity; and
   implement the remedial action on the end-point device.

2. The system of claim 1, wherein executing instructions to capture the real-time network traffic further causes the processing device to:
   generate a multi-dimensional model of the real-time network traffic associated with the end-point device; and
   display, via the virtual reality application, the multi-dimensional model to a user.

3. The system of claim 2, wherein the multi-dimensional model further comprises a stack of data layers for visualization of the real-time network traffic, wherein the stack of data layers comprises a network topology layer, a network traffic layer, a performance metric layer, an incident layer, an application data layer, and nodal information layer.

4. The system of claim 3, wherein executing the instructions further causes the processing device to:
   receive, via the user input device, a user selection of one or more data layers from the stack of data layers;
   generate the multi-dimensional model of the real-time network traffic by overlaying the one or more data layers on one another; and
   display, via the virtual reality application, the multi-dimensional model with the one or more data layers overlaid on one another to the user.

5. The system of claim 2, wherein executing the instructions further causes the processing device to:
   determine that the end-point device is associated with a device administrator;
   trigger an access prompt on a computing device associated with the device administrator to allow the device administrator to access the multi-dimensional model of the real-time network traffic;
   receive a request from the computing device of the device administrator to access the multi-dimensional model in response to the access prompt; and
   generate a controlled access version of the multi-dimensional model of the real-time network traffic in response to the request.

6. The system of claim 5, wherein a level of access associated with the controlled access version of the multi-dimensional model is based on an authorization level of the device administrator.

7. The system of claim 1, wherein executing the instructions further causes the processing device to:
   isolate the end-point device in response to determining that the end-point device is associated with anomalous activity; and
   implement the remedial action on the isolated end-point device to mitigate the effects of the anomalous activity.

8. A computer program product for anomaly recognition in network topologies using interactive visualization, the computer program product comprising a non-transitory computer-readable medium comprising code causing an apparatus to:

determine that an end-point device is associated with anomalous activity;
capture, using a virtual reality application installed on a user input device, real-time network traffic associated with the end-point device;
isolate, using the virtual reality application, network traffic associated with the anomalous activity;
initiate spatial and temporal traffic analysis on the anomalous activity;
determine, using the virtual reality application, an initiator and a recipient associated with the anomalous activity based on the spatial and temporal traffic analysis;
initiate an access management evaluation on the initiator and the recipient;
determine access controls associated with the initiator and the recipient contributing to the anomalous activity; and
initiate a reassessment of the access controls associated with the initiator and the recipient;
determine a remedial action based on the spatial and temporal traffic analysis to mitigate effects of the anomalous activity; and
implement the remedial action on the end-point device.

9. The computer program product of claim 8, wherein the code further causes the apparatus to:
generate a multi-dimensional model of the real-time network traffic associated with the end-point device; and
display, via the virtual reality application, the multi-dimensional model to a user.

10. The computer program product of claim 9, wherein the multi-dimensional model further comprises a stack of data layers for visualization of the real-time network traffic, wherein the stack of data layers comprises a network topology layer, a network traffic layer, a performance metric layer, an incident layer, an application data layer, and nodal information layer.

11. The computer program product of claim 10, wherein the code further causes the apparatus to:
receive, via the user input device, a user selection of one or more data layers from the stack of data layers;
generate the multi-dimensional model of the real-time network traffic by overlaying the one or more data layers on one another; and
display, via the virtual reality application, the multi-dimensional model with the one or more data layers overlaid on one another to the user.

12. The computer program product of claim 9, wherein the code further causes the apparatus to:
determine that the end-point device is associated with a device administrator;
trigger an access prompt on a computing device associated with the device administrator to allow the device administrator to access the multi-dimensional model of the real-time network traffic;
receive a request from the computing device of the device administrator to access the multi-dimensional model in response to the access prompt; and
generate a controlled access version of the multi-dimensional model of the real-time network traffic in response to the request.

13. The computer program product of claim 12, wherein a level of access associated with the controlled access version of the multi-dimensional model is based on an authorization level of the device administrator.

14. The computer program product of claim 8, wherein the code further causes the apparatus to:

isolate the end-point device in response to determining that the end-point device is associated with anomalous activity; and
implement the remedial action on the isolated end-point device to mitigate the effects of the anomalous activity.

15. A method for anomaly recognition in network topologies using interactive visualization, the method comprising:
determining that an end-point device is associated with anomalous activity;
capturing, using a virtual reality application installed on a user input device, real-time network traffic associated with the end-point device;
isolating, using the virtual reality application, network traffic associated with the anomalous activity;
initiating spatial and temporal traffic analysis on the anomalous activity;
determining, using the virtual reality application, an initiator and a recipient associated with the anomalous activity based on the spatial and temporal traffic analysis;
initiating an access management evaluation on the initiator and the recipient;
determining access controls associated with the initiator and the recipient contributing to the anomalous activity;
initiating a reassessment of the access controls associated with the initiator and the recipient;
determining a remedial action based on the spatial and temporal traffic analysis to mitigate effects of the anomalous activity; and
implementing the remedial action on the end-point device.

16. The method of claim 15, wherein the method further comprises:
generating a multi-dimensional model of the real-time network traffic associated with the end-point device; and
displaying, via the virtual reality application, the multi-dimensional model to a user.

17. The method of claim 16, wherein the multi-dimensional model further comprises a stack of data layers for visualization of the real-time network traffic, wherein the stack of data layers comprises a network topology layer, a network traffic layer, a performance metric layer, an incident layer, an application data layer, and nodal information layer.

18. The method of claim 17, wherein the method further comprises:
receiving, via the user input device, a user selection of one or more data layers from the stack of data layers;
generating the multi-dimensional model of the real-time network traffic by overlaying the one or more data layers on one another; and
displaying, via the virtual reality application, the multi-dimensional model with the one or more data layers overlaid on one another to the user.

19. The method of claim 16, wherein the method further comprises:
determining that the end-point device is associated with a device administrator;
triggering an access prompt on a computing device associated with the device administrator to allow the device administrator to access the multi-dimensional model of the real-time network traffic;
receiving a request from the computing device of the device administrator to access the multi-dimensional model in response to the access prompt; and generating a controlled access version of the multi-dimensional model of the real-time network traffic in response to the request.

20. The method of claim 19, wherein a level of access associated with the controlled access version of the multi-dimensional model is based on an authorization level of the device administrator.

\* \* \* \* \*